(12) United States Patent
Allen

(10) Patent No.: US 7,606,641 B2
(45) Date of Patent: Oct. 20, 2009

(54) FUEL CONSUMPTION DATA TRACKING/COLLECTION AND AIRCRAFT/ROUTE OPTIMIZATION

(75) Inventor: David L. Allen, Kent, WA (US)

(73) Assignee: The Boeing Company, Chicago, IL (US)

( * ) Notice: Subject to any disclaimer, the term of this patent is extended or adjusted under 35 U.S.C. 154(b) by 385 days.

(21) Appl. No.: 11/197,101

(22) Filed: Aug. 4, 2005

(65) Prior Publication Data

US 2007/0032921 A1 Feb. 8, 2007

(51) Int. Cl.
*G01C 23/00* (2006.01)
*G06G 7/76* (2006.01)

(52) U.S. Cl. .......................................... 701/3; 701/123
(58) Field of Classification Search .................. 701/3, 701/123
See application file for complete search history.

(56) References Cited

U.S. PATENT DOCUMENTS

| | | | |
|---|---|---|---|
| 4,642,775 A | | 2/1987 | Cline et al. |
| 4,729,102 A | * | 3/1988 | Miller et al. ................... 701/14 |
| 5,121,325 A | | 6/1992 | DeJonge |
| 5,398,186 A | | 3/1995 | Nakhla |
| 6,078,850 A | | 6/2000 | Kane et al. |
| 6,148,179 A | * | 11/2000 | Wright et al. ............... 455/66.1 |
| 6,173,159 B1 | | 1/2001 | Wright et al. |
| 6,606,544 B2 | * | 8/2003 | Glenn et al. ................... 701/3 |
| 2004/0226996 A1 | * | 11/2004 | Stefani ......................... 235/384 |
| 2005/0288831 A1 | * | 12/2005 | Lusardi et al. ................... 701/3 |

FOREIGN PATENT DOCUMENTS

| | | |
|---|---|---|
| WO | 0125727 A1 | 4/2001 |
| WO | 0208057 A1 | 1/2002 |
| WO | 03025507 A2 | 3/2003 |

OTHER PUBLICATIONS

MyBoeingFleet—Your Portal to Boeing, http://www.boeing.com/commercial/aviationservices/overview, Jun. 24, 2005, 4 pages.
Commercial Aviation Services—Global Customer Support, http://www.boeing.com/commercial/aviationservices/myboeingfleet/, Jun. 24, 2005, 3 pages.

(Continued)

*Primary Examiner*—Mark Hellner
*Assistant Examiner*—Helal A Algahaim
(74) *Attorney, Agent, or Firm*—Armstrong Teasdale LLP

(57) ABSTRACT

An automated system tracks and records factors that affect fuel consumption. Configuration factors such as the actual engine(s) used in the airplane, weight, weight distribution, engine pressure, engine rotation speeds, etc.; environmental factors such as wind speed and direction, temperature, altitude and air pressure, etc.; and flight path factors such as actual route flown, distance flown, take-off/landing requirements for the airports, etc. are tracked and recorded. The resulting data is used to "normalize" the fuel efficiency of each airplane and engine. Normalized data for an airline's fleet of airplanes and engines are used to find optimal airplane/engine combinations for the routes serviced by the airline. The collected data itself can be sent from the aircraft during flight or, a notification message can be sent from the aircraft to the airline computer system to have the collected data downloaded from the airplane at the next landing.

20 Claims, 6 Drawing Sheets

OTHER PUBLICATIONS

Jeppesen, Electronics Flight Bag, May 2003, 12 pages.

About ACARS, http://www.acarsonline.co.uk/aclink/alabout.htm, Jun. 24, 2005, 4 pages.

connexion by Boeing, http://www.connexionbyboeing.com/index.cfm, Jun. 24, 2005, 1 page.

Notification of Transmittal of the International Search Report and the Written Opinion of the International Searching Authority, or the Declaration, Apr. 20, 2007, 14 pgs.

Abdelghany, Khaled et al., A model for the airlines' fuel management strategies, Journal of Air Transport Management, vol. 11, No. 4, Jul. 2005, pp. 199-206.

* cited by examiner

FUEL CONSUMPTION DATA TRACKING/COLLECTION AND AIRCRAFT/ROUTE OPTIMIZATION

FIELD

Embodiments of the present invention relate generally to computer systems and, more particularly, to computer systems for tracking fuel consumption for aircraft.

BACKGROUND

Fuel costs are a significant factor in operating airplanes. The fuel consumption rates of individual airplanes can vary, even among aircraft of the same model and using the same model engines. Determining the actual fuel consumption efficiency of individual airplanes can be difficult due to the various factors that can affect fuel consumption such as, for example, environmental wind direction and speed, temperature, altitude, etc. Many of these factors are dynamic and change during flight.

One approach to determining fuel consumption rates is to manually track fuel consumed at the end of each flight. However, this approach does not track the other factors mentioned above. This approach could be modified to manually track the other factors, but the burden on the airplane flight crew would be significant (Note: The workload of the flight crew may be such that they do not have the opportunity to manually record this data. Some of this data is not immediately available to the flight crew) and may make such an approach impractical. Although some shortcomings of conventional systems are discussed, this background information is not intended to identify problems that must be addressed by the claimed subject matter.

SUMMARY

According to aspects of various described embodiments, various factors that affect fuel consumption are dynamically tracked and collected. In one aspect, configuration factors such as the actual engine(s) used in the airplane, the weight, the weight distribution, engine pressure, engine rotation speeds, etc. are tracked and recorded; environmental factors such as wind speed and direction, temperature, altitude and air pressure, etc. are tracked and recorded; and flight path factors such as the actual route flown, distance flown, take-off/landing requirements for the airports, etc. are tracked and recorded. In one implementation, an automated system tracks and collects the selected data using systems typically on-board aircraft such as a Flight Management System (FMS) and/or airplane condition monitoring system (ACMS). The resulting data is used to "normalize" the fuel efficiency performance of each airplane, each engine and/or airplane/engine combination.

In another aspect, normalized data for an airline's fleet of airplanes and engines are used to find optimal airplane/engine combinations for the routes serviced by the airline. The optimization typically includes accounting for the critical fuel reserve requirements for the routes.

In yet another aspect, information related to the collected data is transmitted from an airplane to an airline computer system while the airplane is in flight using one of the available air-to-ground links typically supported by an aircraft. In one implementation, the collected data (e.g., snapshots of the tracked data) itself is sent from the aircraft in real-time or near real-time. In other implementations, a notification message is sent from the aircraft to the airline computer system to have the collected data downloaded from the airplane at the next landing. In some implementations, the tracking, collection, and downloading of the data is performed by an automated system, avoiding the need for flight crew intervention.

Embodiments may be implemented as a computer process, a computer system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION

Various embodiments are described more fully below with reference to the accompanying drawings, which form a part hereof, and which show specific exemplary embodiments for practicing the invention. However, embodiments may be implemented in many different forms and should not be construed as limited to the embodiments set forth herein; rather, these embodiments are provided so that this disclosure will be thorough and complete, and will fully convey the scope of the invention to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

The logical operations of the various embodiments are implemented (a) as a sequence of computer implemented steps running on a computing system and/or (b) as interconnected machine modules within the computing system. The implementation is a matter of choice dependent on the performance requirements of the computing system implementing the embodiment. Accordingly, the logical operations making up the embodiments described herein are referred to alternatively as operations, steps or modules.

Figure 1:
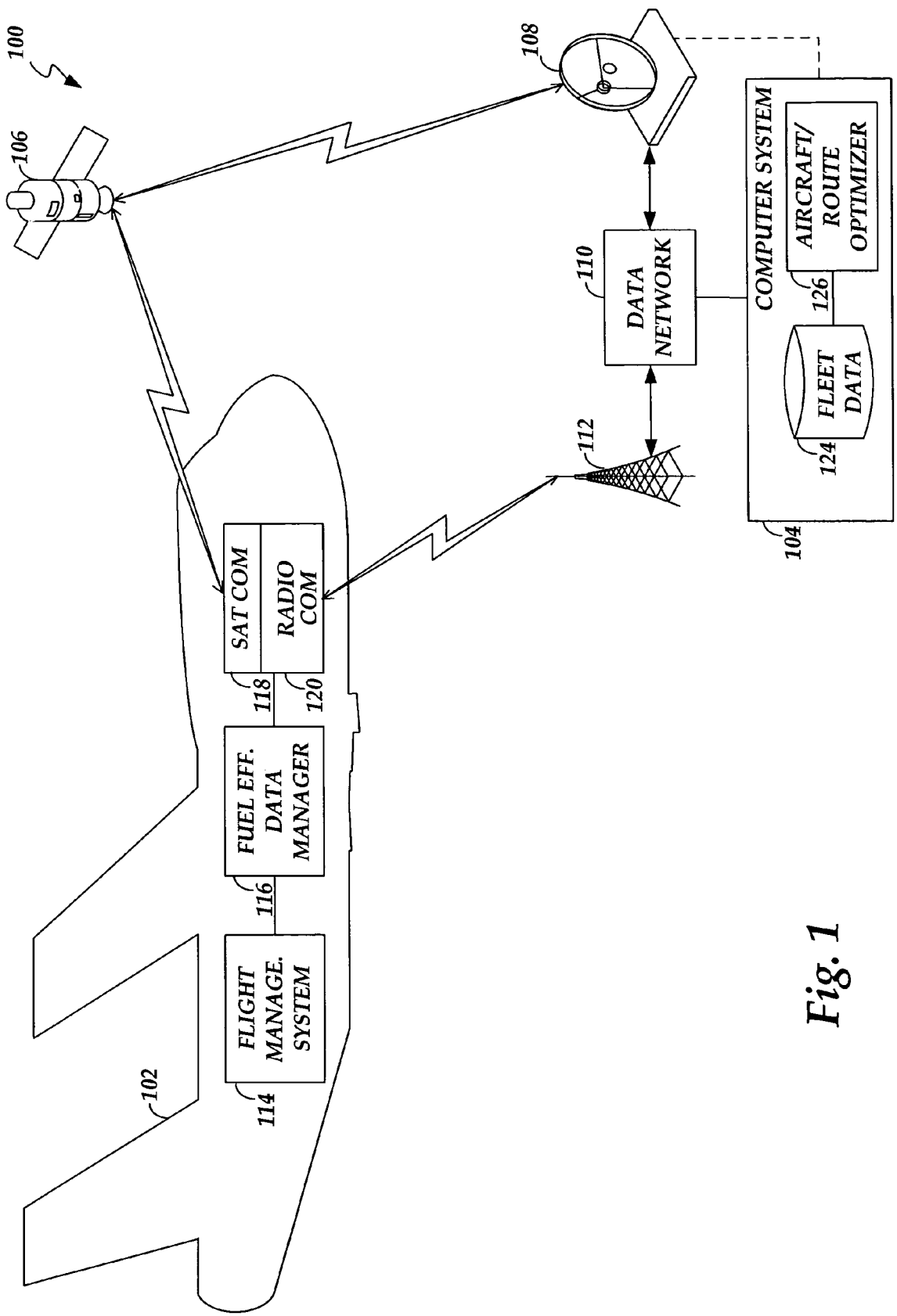
FIG. 1 is a diagram illustrating an exemplary system for tracking and collecting fuel consumption data and determining optimal aircraft and aircraft configurations for routes, according to one embodiment.

FIG. 1 illustrates an exemplary system 100 for tracking and collecting fuel consumption data and determining optimal aircraft and aircraft configurations for routes, according to one embodiment. In this embodiment, system 100 includes an aircraft 102, a computer system 104 (e.g., a ground-based computer system maintained by an airline or a third party such as Boeing), one or more satellites 106, one or more satellite communication receivers 108, a data network 110, and one or more radio communication system receivers 112 (Note: the radio receivers can be those which communicate with the airplane while in flight or radios, such as 802.11 wireless, which communicate only on the ground). Further, in accordance with this embodiment, aircraft 102 includes a Flight Management System 114, a fuel efficiency data manager 116, a satellite communication unit 118 and a radio communication unit 120. Still further, in accordance with this embodiment, computer system 104 includes a fleet datastore 124 and an aircraft/route optimizer component 126.

In this embodiment, Flight Management System 114 is coupled to a variety of aircraft sensors (not shown) that provide information related to the performance of the aircraft, and environmental conditions. For example, the sensors may provide information such as engine pressure, engine rotation speeds, global positioning system (GPS) location information, wind speed and direction, temperature, altitude and air pressure. In addition, FMS settings which affect the performance of the aircraft including both flight settings (such as target speeds) and route settings (such as flying off-path to avoid weather) may form part of the collected information. Flight Management System 114 includes interfaces to receive the output signals from the sensors, including analog-to-digital converters for handling analog sensor signals. In some embodiments, Flight Management System 114 is implemented using a Flight Management System (FMS) and airplane condition monitoring system (ACMS) that are typically installed in commercial aircraft.

In some embodiments, additional system parameters can be tracked such as thrust setting or Cost Index. Cost index is a factor which is entered by the flight crew into the Flight Management System, as a constant ranging from 1 to 999. It causes the Flight Management System to value time versus fuel burned. For example, an entry of 1 would cause the Flight Management System to perform all operations to minimize fuel burned. An entry of 999 would cause the FMS to perform all operations to minimize trip time. Note: The FMS provides the speed targets and engine settings in cruise and takeoff. Another input would be the FMS Drag Factor which is set as a variable in each airplane's FMS to account for different drag characteristics of the individual airplanes.

Fuel efficiency data manager 116, in this embodiment, is coupled to Flight Management System 114 to collect and record the data from the sensors. In one embodiment, fuel efficiency data manager 116 is implemented as an application of an Electronic Flight Bag (EFB) typically installed in commercial aircraft. In some embodiments, the EFB (not shown) also includes interfaces to communication systems installed in the aircraft (e.g., satellite communication unit 118 and radio communication unit 120), which allows fuel efficiency data manager 116 to send information related to the collected data to computer system 104. In one embodiment, fuel efficiency data manager 116 causes the collected data (e.g., snapshots of the tracked data) to be transmitted to computer system 104 in real-time or near real-time. In other embodiments, fuel efficiency data manager 116 causes a notification message to be transmitted from aircraft 102 to computer system 104 to have the collected data downloaded from aircraft 102 when it lands at the next destination. In some embodiments, the tracking, collection, and downloading of the data is performed by an automated system, avoiding the need for flight crew intervention.

As previously mentioned, aircraft 102 can communicate with other entities using satellite communication unit 118 or radio communication unit 120. In some embodiments, satellite communication unit 118 can be implemented using a transceiver for a packet based digital satellite communication system complying with ARINC 761-2 specification published by the Airlines Electronic Engineering Committee (AEEC). Satellite communication unit 118 can transmit/receive information to/from computer system 104 via one or more satellites 106, one or more satellite communication receivers 108, and data network 110. In an alternative embodiment, satellite communication unit 118 can communicate with computer system 104 using a more direct satellite communication system (indicated by dashed lines in FIG. 2) such as Connexion available from Connexion by Boeing$^{SM}$, Seattle Wash.

In some embodiments, radio communication unit 120 can be implemented using a transceiver for a packet based digital radio communication system, such as a VHF transceiver supporting the ACARS (aircraft communications addressing and reporting system). ACARS is typically installed in commercial aircraft.

Further, although not shown in FIG. 1, aircraft 102 can in some embodiments communicate with computer system 104 using a "wired" connection when aircraft 102 is on the ground. For example, in systems that use EFBs, the EFB system includes an EFB ground system that is connected to the aircraft after landing to transfer data between the aircraft's EFB and the computer system.

Still further, although not shown in FIG. 1, aircraft 102 can in some embodiments communicate with computer system 104 using a "wireless" ground connection with aircraft 102. For example, in systems that use EFBs, the EFB system can communicate with an airport (or airline) hosted implementation of 802.11. This allows a direct, secure connection using internet protocols, to the airline host computer system 104 through the data network 110.

Computer system 104 is a computer system that hosts fleet datastore 124 and aircraft/route optimizer component 126. In some embodiments, computer system 104 is implemented by an airline to manage its fleet of aircraft. In other embodiments, computer system 104 can be implemented by a service provider or portal (e.g., MyBoeingFleet available from Boeing Commercial Airplanes, Seattle, Wash.).

Fleet datastore 124, in this embodiment, is a data structure used to store the data generated by and received from aircraft 102, as well as such data from other aircraft in a fleet of aircraft. Fleet datastore 124 can also store information related to routes flown by the fleet (e.g., distances, schedules, etc.). For example, fleet datastore 124 may be implemented by a relational database that can be queried by aircraft/route optimizer component 126.

Aircraft/route optimizer component 126, in this embodiment, is an application or module hosted by computer system 104 that normalizes the fuel consumption data received for each aircraft. That is, aircraft/route optimizer component 126 takes into account environmental factors such as temperature, wind direction and speed, air pressure, altitude, etc. experienced during flights made by an aircraft to more accurately determine that aircraft's actual fuel efficiency. In some embodiments, aircraft/route optimizer component 126 can also take into the configuration of the aircraft during the flights to more accurately determine the aircraft's fuel efficiency. For example, an aircraft's fuel efficiency may vary with the individual engines installed on the aircraft. Thus, in some embodiments, aircraft/route optimizer component 126 can determine normalized fuel efficiencies for various combinations of aircraft and engines. Other factors in an aircraft's configuration include the weights of the loaded aircraft at the start of the flight, the distribution of the weight in the aircraft, etc. This system also has the capability to track individual engine performance as they are moved from airplane to airplane, thereby isolating individual engines from the airframe components which affect fuel consumption (such as drag).

In addition, this embodiment of aircraft/route optimizer component 126 can determine an optimal assignment of available aircraft/engine combinations to routes flown by the fleet. For example, based on the normalized fuel efficiency determinations, expected environmental conditions, expected aircraft configurations, and the distances of the routes, aircraft/route optimizer component 126 can determine which aircraft/engine combinations have sufficient fuel efficiency performance to fly particular routes and meet the critical fuel reserve requirements for those routes in an optimal cost or fuel usage manner. In some embodiments, there are two types of fuel reserve. There are regulatory requirements, e.g., the aircraft needs to be able to hold at the destination for 30 minutes and then fly to nearest alternate and hold for another period of time. Then the pilots can add to that reserve as they see fit. Typically, the most fuel-efficient combinations will be assigned the longer routes so that less fuel needs to be carried to meet the critical fuel reserve requirements. Certain routes are "payload limited" in that payload is removed in order to assure the aircraft can meet the route requirements without diverting for fuel. Accurate understanding of the aircraft/engine performance can reduce the need for payload removal. Because an aircraft may have to fly a "circuit" of multiple routes of varying distance, the optimal assignment of aircraft/engine combinations to routes may not be easily determined. In one embodiment, the expected total fuel consumption for each permutation of aircraft/engine combination and route assignment can be calculated and then assignments that results in the lowest cost or lowest fuel consumption can be selected.

Figure 2:
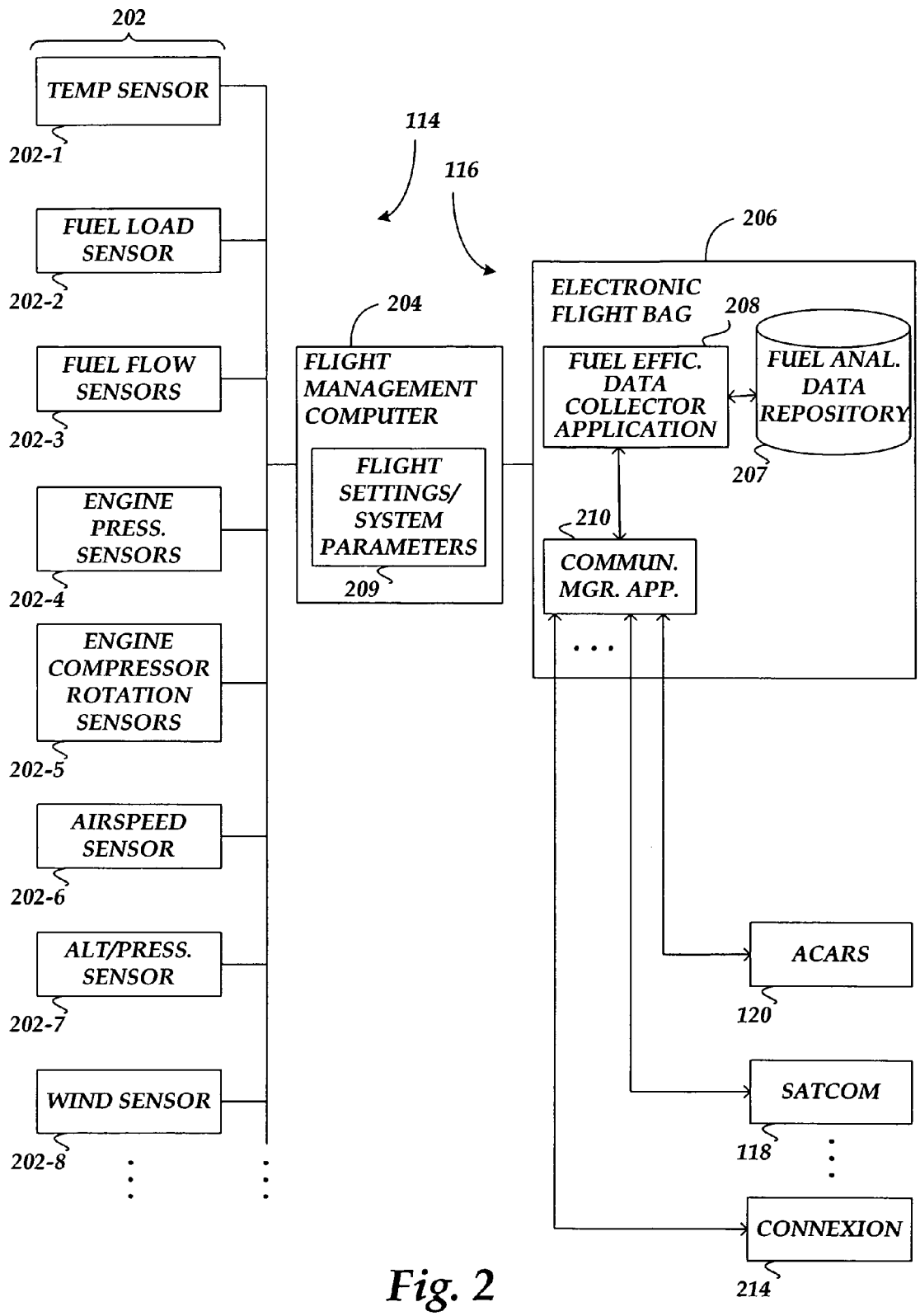
FIG. 2 is a diagram illustrating exemplary airplane components of the system depicted in FIG. 1, according to one embodiment.

FIG. 2 illustrates exemplary components of aircraft 102 (FIG. 1) used for tracking and collecting fuel consumption data, according to one embodiment. In this embodiment, aircraft 102 includes sensors 202 that sense various environmental and aircraft conditions, a flight management computer 204, and an electronic flight bag (EFB) system 206, a fuel analysis data repository 207, which hosts a fuel efficiency data collector application 208 and a communications manager application 210.

In this embodiment, sensors 202 include one or more of each of the following: a temperature sensor 202-1; a fuel load sensor 202-2; a fuel flow sensor 202-3; an engine pressure sensor 202-4; an engine compressor rotation speed sensor 202-5; an airspeed sensor 202-6; an altitude/air pressure sensor 202-7; and a wind speed and direction sensor 202-8. Additional sensors may be used in other embodiments. Flight management computer 204 is coupled to receive the output signals from sensors 202, and in some embodiments to a GPS unit (not shown). In one embodiment, flight management computer 204 is implemented using a commercially available flight management computer such as used in some commercial aircraft. Such flight management computers typically interface with other sensors (not shown) in addition to sensors 202 shown in FIG. 2. Sensors 202 and flight management computer 204 together implement an embodiment of Flight Management System 114 (FIG. 1). The flight management computer can also provide internal data which is used by the FMS to derive the flight path and engine settings such as: Cost Index, Drag Factor, Offset route operation, Optimum Altitude, Autothrottle settings, and others. This internal data is indicated as flight settings and system parameters 208 in flight management computer 204.

Fuel efficiency data collector application 208 and communications manager application 210 are hosted by EFB 206. In one embodiment, EFB 206 is implemented using an EFB available from Boeing. Fuel efficiency data collector application 208 communicates with flight management computer 204 to obtain sensor data and internal FMS data used in determining the aircraft's fuel efficiency. For example, in this embodiment fuel efficiency data collector application 208 periodically retrieves "snapshots" of the data from sensors 202 to be used in determining the aircraft's fuel efficiency by computer system 104 (FIG. 1). The collected data can then be stored in fuel analysis data repository 207.

Communications manager application 210 provides an interface between fuel efficiency data collector application 208 (and other applications running on EFB 206) and the communications units 118 and 120 (see FIG. 1). In this embodiment, satellite communication unit 118 is an ARINC 761 compliant satellite communication (SATCOM) system, and radio communication unit 120 is an ACARS compliant system. Communications manager application 210 can select the appropriate communications unit to transmit data collected by fuel efficiency data collector application 208 (e.g., some locations may support ACARS but not SATCOM communications). In addition, communications manager application 210 can format the data as required by the selected communications unit. As shown in FIG. 2, communications manager application 210 can also serve as an interface to other communications units such as a unit 214 to support the aforementioned Connexion by Boeing$^{SM}$ system, which is a satellite packet-based communication system or an airport wireless connection.

Figure 3:
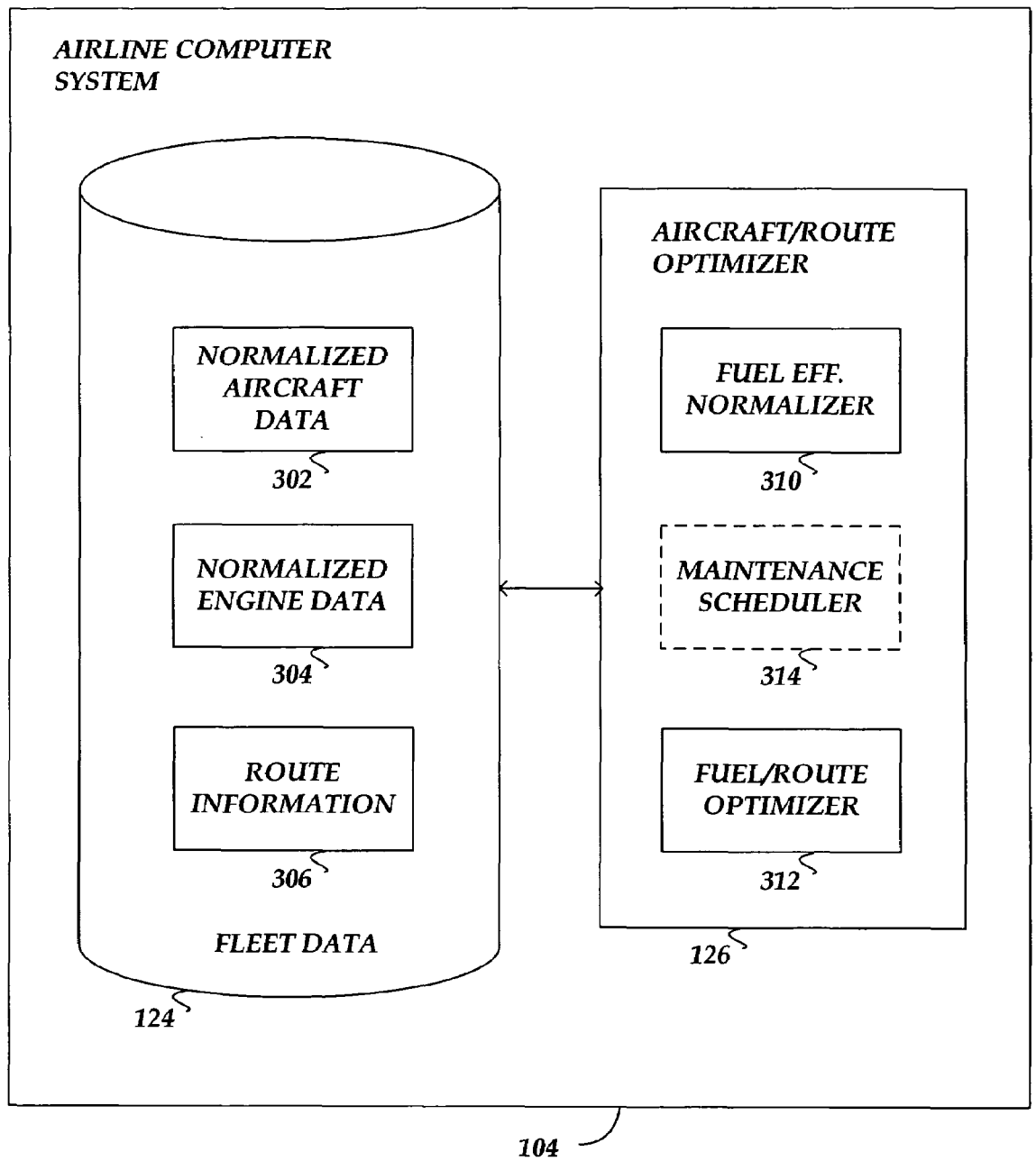
FIG. 3 is a diagram illustrating an exemplary system for determining optimal aircraft/aircraft configurations for routes, according to one embodiment

FIG. 3 illustrates an exemplary implementation of computer system 104 (FIG. 1), according to one embodiment. In this embodiment, computer system 104 is a ground-based computer system maintained by an airline to store and process information related to operating a fleet of aircraft and the routes flown by the aircraft. In other embodiments, computer system 104 may be implemented as a service or portal such as the aforementioned MyBoeingFleet service. In this exemplary embodiment, computer system 104 includes fleet datastore 124 that contains normalized aircraft datastore 302, normalized engine datastore 304, and route information datastore 306; and aircraft/route optimizer component 126 that includes fuel efficiency normalizer component 310, and fuel/route optimizer component 312. In some embodiments, aircraft/route optimizer component 126 may also include a maintenance scheduler 314, shown in phantom in FIG. 3.

Fuel efficiency normalizer component 310, in this embodiment, receives data from the fuel efficiency data manager 116 (FIGS. 1, 2) of fleet aircraft and determines normalized fuel efficiency statistics for each aircraft, each engine and each aircraft/engine combination. As used in this context, normalized fuel efficiency statistics refer to statistics such as fuel consumption rate with factors such as wind speed and direction, temperature, pressure, altitude, weight, etc. being accounted for in the calculations so that the aircraft and engines can be accurately compared. In some embodiments, moving average techniques are also used to detect performance deterioration of the aircraft and/or engines. Fuel efficiency normalizer component 310 stores the normalized fuel efficiency data for the fleet's aircraft in normalized aircraft datastore 302. Similarly, fuel efficiency normalizer component 310 stores the normalized fuel efficiency data for the fleet's engines in normalized engine datastore 304.

Fuel/route optimizer component 312, in this embodiment, periodically retrieves the normalized data from normalized aircraft datastore 302, normalized engine datastore 304 and route information datastore 306 and determines an optimal assignment of aircraft and engines to routes. As previously mentioned, in one embodiment the most fuel efficient aircraft/engine combinations are assigned to the routes with the longest distances in order to reduce overall fuel usage. In some embodiments, fuel/route optimizer component 312 also receives fuel cost information for various starting points of the routes and can determine an optimal assignment based on cost rather than fuel usage.

In some embodiments, maintenance scheduler 314 can be used to detect unexpected drops in fuel efficiency for aircraft and engines. Such performance drops can indicate deterioration/malfunction of the aircraft or engine requiring maintenance. Maintenance scheduler 314 can be configured to trigger maintenance inspections for aircraft and engines that have unexpected performance drops.

Exemplary "Fuel Efficiency Data Collection" Operational Flow

Figure 4:
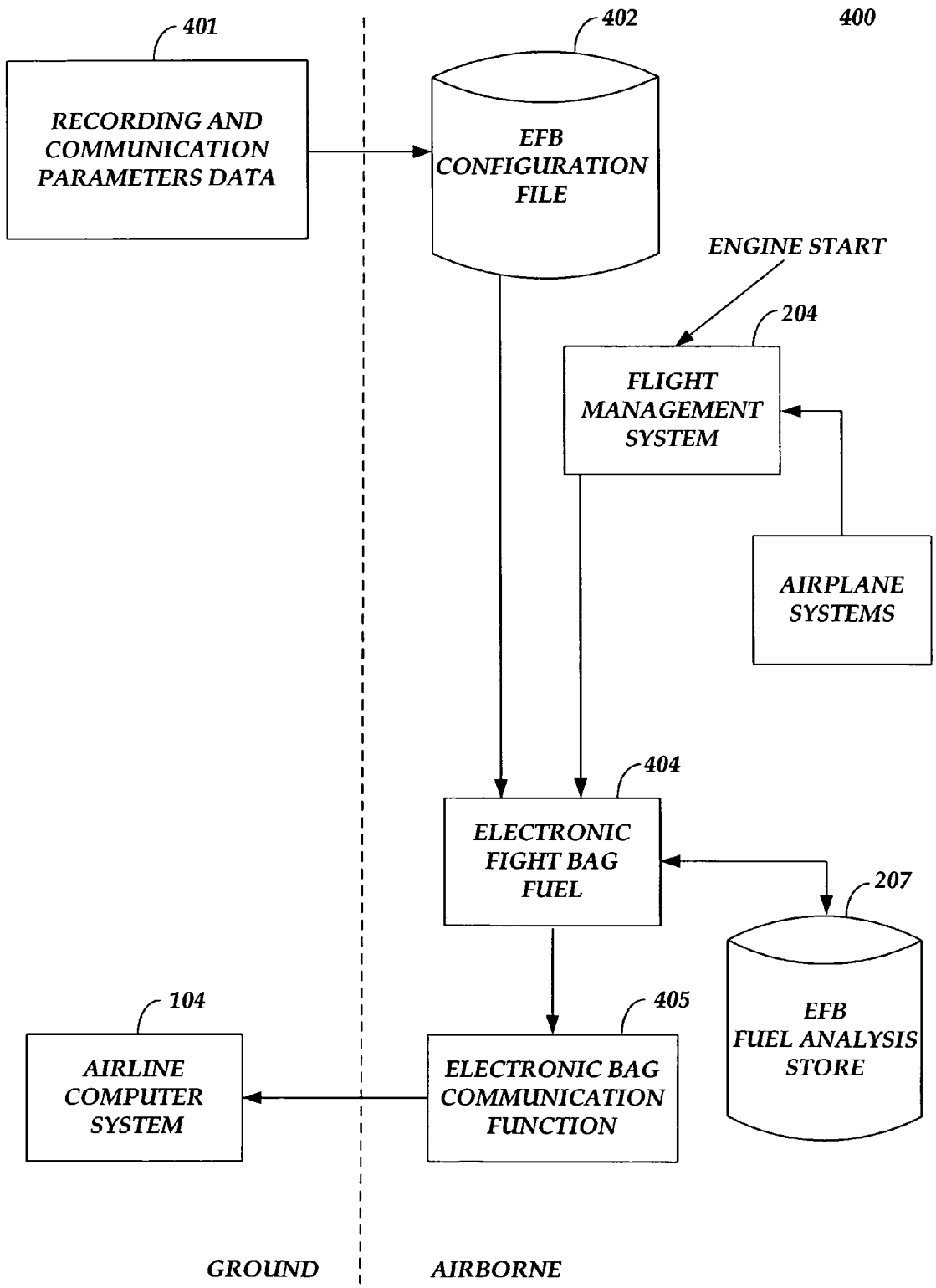
FIG. 4 is a diagram illustrating an exemplary EFB-based system for tracking and collecting data related to an aircraft's fuel consumption, according to one embodiment.

FIG. 4 illustrates an EFB-based system 400 for tracking and collecting data related to an aircraft's fuel consumption, according to one embodiment.

In this embodiment of system 400, the airline uses a ground function (as part of system 104) to define both the frequency of reporting and the selected communication channel(s) (in priority order) to use in the reporting. This data is shown as recording and communication parameter data 401 in FIG. 4. Data 401 is stored in the EFB 204 as an EFB Fuel Analysis Function configuration file repository 402.

Flight Management System 204, in this embodiment, continuously broadcasts information related to fuel efficiency (e.g., as described in conjunction with FIG. 2) to Electronic Flight Bag 206. Electronic Flight Bag 206 will detect engine start (via inputs from the FMS 204) and begin recording information on a periodic basis defined by the airline. This information would be received from engine start until engine shutdown (as reported by the FMS 204). The data is selected based on its effect on fuel efficiency. For example, as previously described, the data can be sensor data such as wind speed and direction, temperature, pressure, altitude, weight, fuel flow, engine pressure ratio, engine compressor rotation speed, etc. In one embodiment, a data collection application hosted by an EFB (e.g., fuel efficiency data collector application 208 running in EFB 206, shown in FIG. 2) collects the data.

An EFB Fuel Analysis Function 404 would record the collected data and store it in an EFB Fuel Analysis Data Repository 207. Periodically, the EFB Fuel Analysis Function would collect the data and send it via the EFB Communication Function 405 to the Airline Computer System 104. The frequency and communication channel is controlled by the Airline Configuration file. The acquiring, retention, and communication of data would cease at engine shutdown. Thus, in this embodiment, the data collection application periodically retrieves snapshots of selected data while the aircraft is in flight.

This data collection application can also store the snapshot of data on-board for later download and processing once the aircraft has landed, or it can have the snapshot transmitted to a computer system (such as computer system 104 in FIG. 1) using a SATCOM unit or a radio communication unit typically installed on commercial aircraft. In one embodiment, the data collection application can send a message to the computer system to notify the computer system to download the collected data upon landing.

Exemplary "Fuel Efficiency Data Normalization" Operational Flow

Figure 5:
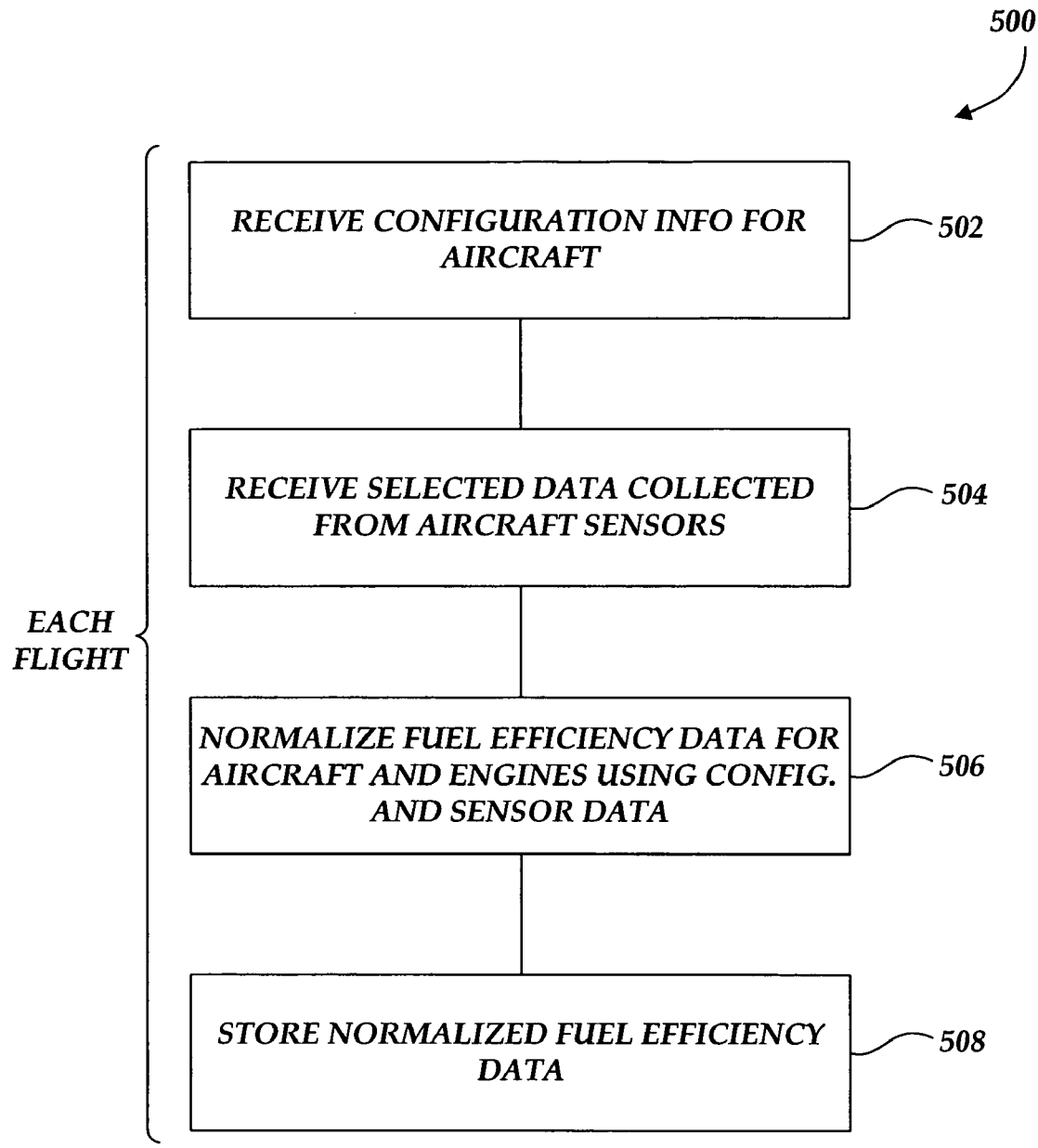
FIG. 5 is a flow diagram illustrating operational flow in normalizing fuel consumption criteria for aircraft and aircraft configurations, according to one embodiment.

FIG. 5 illustrates an operational flow 500 for normalizing fuel efficiency data for aircraft and aircraft configurations, according to one embodiment. For example, operational flow 500 can be performed during each flight of each aircraft in a fleet of aircraft. Operational flow 500 may be performed in any suitable computing environment. For example, operational flow 500 may be performed by a computer system such as computer system 104 (FIGS. 1, 3). Therefore, the description of operational flow 500 may refer to at least one of the components of FIG. 1 or 3. However, any such reference to components of FIG. 1 or 3 is for descriptive purposes only, and it is to be understood that the implementations of FIGS. 1 and 3 are non-limiting environments for operational flow 500.

At a block 502, information related to the configuration of the aircraft is received. The airline ground system 104 has a function 502 by which the airline can establish the configuration of their fleet. This includes entering data to identify each airplane and establishing which engines are installed on the airplane. This can be done manually or be done automatically through interfaces to existing airline configuration control systems. This creates a data repository of information which is used by later functions.

In one embodiment, a data normalization component such as fuel efficiency normalizer component 310 (FIG. 3) of computer system 104 receives the aircraft configuration information. As used in this context, aircraft configuration information includes identification of the particular aircraft and the individual engine(s) installed on the aircraft, the weight of the loaded aircraft at the start of the flight, the distribution of the weight in the aircraft, etc.

At a block 504, selected data from aircraft sensors and flight management systems are received. In this embodiment, the aforementioned data normalization component receives the selected aircraft sensor data. The selected data can be a series of periodically taken snapshots of sensor data such as wind speed and direction, temperature, pressure, altitude, weight, fuel flow, engine pressure ratio, engine compressor rotation speed, etc.

At a block 506, normalized fuel efficiency data for the aircraft and engine(s) is determined using the configuration information and sensor data received at blocks 502 and 504. In this embodiment, the aforementioned data normalization component calculates the normalized fuel efficiency data for the aircraft and engine(s). Historic data from 508 may also be used in the integration of the solution.

At a block 508, the normalized fuel efficiency data for the aircraft and engine(s) are stored for later processing. In this embodiment, the data normalization component stores the normalized fuel efficiency data in a datastore such as fleet datastore 124 (FIGS. 1, 3).

In some embodiments, the normalized fuel efficiency data for the aircraft and engine(s) collected over a period of time can be stored so that an average normalized fuel efficiency can be determined for each aircraft. Unusual changes in fuel efficiency (compared to the average) can be detected to serve as an indication of an equipment problem requiring maintenance action.

Although operational flow 500 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined.

Exemplary "Aircraft/Route Optimization" Operational Flow

Figure 6:
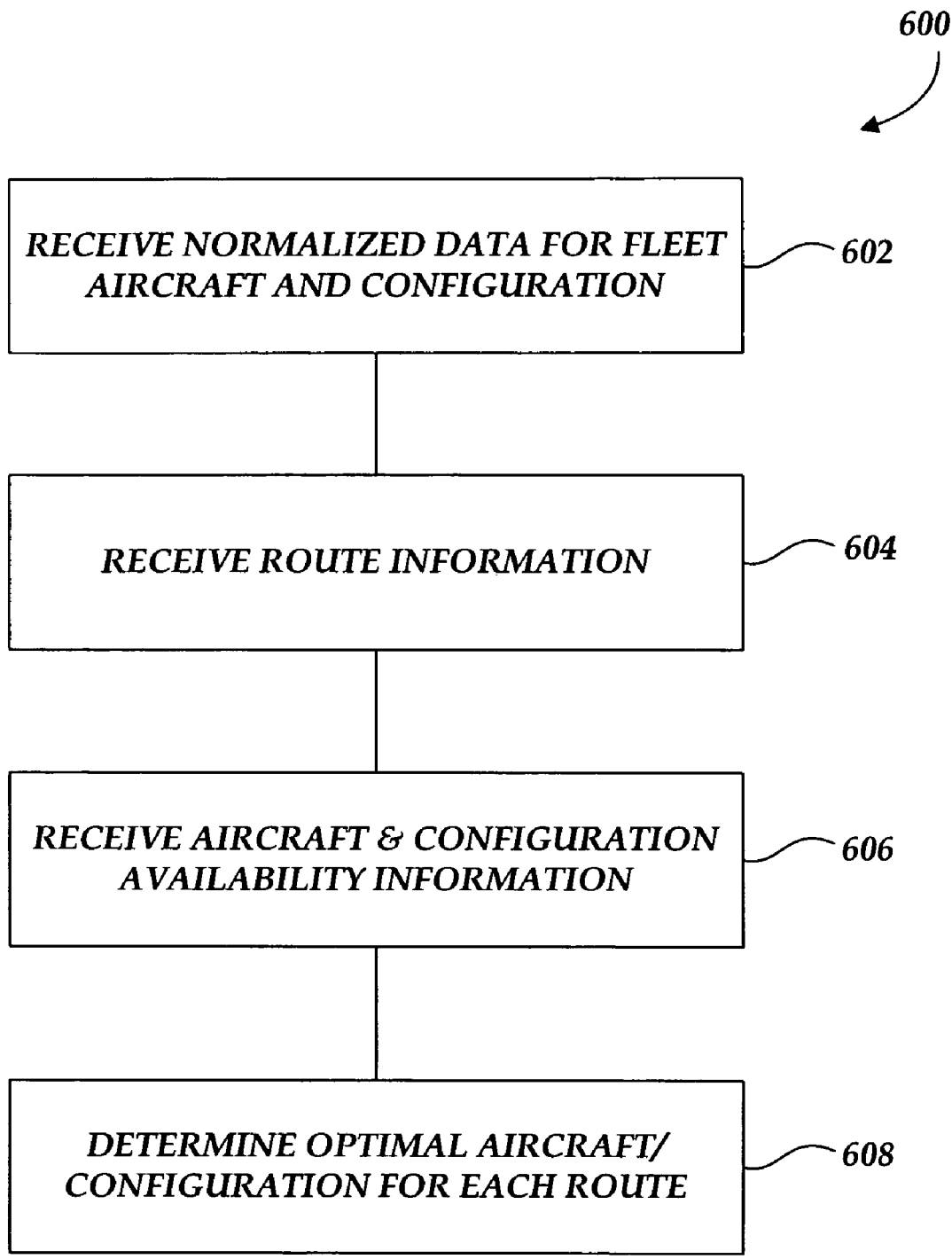
FIG. 6 is a flow diagram illustrating operational flow in determining optimal aircraft/aircraft configurations for routes, according to one embodiment.

FIG. 6 illustrates an operational flow 600 for determining optimal aircraft/aircraft configurations for routes serviced by an airline, according to one embodiment. Operational flow 600 may be performed in any suitable computing environment. For example, operational flow 600 may be performed by a computer system such as computer system 104 (FIGS. 1, 3). Therefore, the description of operational flow 600 may refer to at least one of the components of FIGS. 1 or 3. However, any such reference to components of FIGS. 1 or 3 is for descriptive purposes only, and it is to be understood that the implementations of FIGS. 1 and 3 are non-limiting environments for operational flow 600.

At a block 602, normalized sensor data and configuration data is received. In this embodiment, an optimizer component such as aircraft/route optimizer component 126 (FIGS. 1, 3) of computer system 104 receives the normalized sensor data and configuration data from a datastore such as datastore 124 (FIGS. 1, 3).

At a block 604, route information is received. In this embodiment, the aforementioned optimizer component receives the route information from a datastore maintained by the airline. For example, the route information may be stored in a datastore such as route information datastore 306 (FIG. 3).

At a block 606, aircraft and engine availability information is received. In some instances, particular aircraft and/or engines may be unavailable because they are being repaired or serviced. In this embodiment, the aforementioned optimizer component receives the aircraft and engine availability information from a datastore maintained by the airline.

At a block 608, an optimal aircraft and engine combination is determined for each route serviced by the airline. In this embodiment, the aforementioned optimizer component determines the optimal aircraft/engine combination for each route using the normalized data, route information and aircraft/engine availability information received at blocks 602, 604 and 606. As previously described, in one optimization approach the most fuel efficient aircraft/engine combinations are assigned to the routes with the longest distances in order to reduce overall fuel usage. In another approach, fuel cost information for various points of the routes is used to determine an optimal assignment based on cost rather than fuel usage.

Although operational flow 600 is illustrated and described sequentially in a particular order, in other embodiments, the operations described in the blocks may be performed in different orders, multiple times, and/or in parallel. Further, in some embodiments, one or more operations described in the blocks may be separated into another block, omitted or combined. It should also be noted that this operation could be used both tactically and strategically. In a tactical situation, this could be used to select the best aircraft to put on a route as a replacement. In a strategic situation, this function could be used to select the best aircraft to dedicate to an especially demanding route.

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal.

Reference has been made throughout this specification to "one embodiment," "an embodiment," or "an example embodiment" meaning that a particular described feature, structure, or characteristic is included in at least one embodiment of the present invention. Thus, usage of such phrases may refer to more than just one embodiment. Furthermore, the described features, structures, or characteristics may be combined in any suitable manner in one or more embodiments.

One skilled in the relevant art may recognize, however, that the invention may be practiced without one or more of the specific details, or with other methods, resources, materials, etc. In other instances, well known structures, resources, or operations have not been shown or described in detail merely to avoid obscuring aspects of the invention.

While example embodiments and applications of the present invention have been illustrated and described, it is to be understood that the invention is not limited to the precise configuration and resources described above. Various modifications, changes, and variations apparent to those skilled in the art may be made in the arrangement, operation, and details of the methods and systems of the present invention disclosed herein without departing from the scope of the claimed invention.

What is claimed is:

1. A method for assigning aircraft to routes, the method comprising:
 receiving, at a computer system, fuel consumption data for each aircraft of a fleet of aircraft, the fuel consumption data obtained during flights of the fleet of aircraft;
 receiving, at the computer system, fuel consumption data for each aircraft engine of the fleet of aircraft, the fuel consumption data obtained during flights associated with the individual aircraft engines;
 normalizing, with the computer system, the aircraft and aircraft engine fuel consumption data based on environmental factors experienced by the aircraft and the aircraft engines during the flights when the fuel consumption data was obtained;

determining, with the computer system, a fuel efficiency for each aircraft and aircraft engine using the normalized fuel consumption data;

receiving, at the computer system, information related to routes serviced by the fleet of aircraft; and determining, utilizing the computer system, an assignment of aircraft and engine combinations to the routes serviced by the fleet of aircraft based on the determined fuel efficiency for each aircraft and aircraft engine of the fleet of aircraft.

2. The method of claim 1 wherein the information related to fuel consumption data and experienced environmental factors for each aircraft and aircraft engine of the fleet of aircraft is updated with snapshots of sensor data obtained during flights of the fleet of aircraft.

3. The method of claim 2 wherein the snapshots are transmitted to a computer system for processing during flights of the aircraft of the fleet of aircraft.

4. The method of claim 2 wherein the snapshots are transmitted to a computer system for processing after each aircraft of the fleet of aircraft has landed after a flight.

5. The method of claim 1 wherein the information related to fuel efficiency for each aircraft and aircraft engine of the fleet of aircraft is received at the computer system via electronic flight bags.

6. The method of claim 1 wherein an automated system is used to obtain the fuel consumption data for each aircraft and aircraft engine of the fleet of aircraft.

7. The method of claim 1 wherein a portal service is used to: receive and process the fuel consumption data for each aircraft and aircraft engine, receive information related to routes serviced by the fleet of aircraft, and to determine the assignment of aircraft and aircraft engines to the routes serviced by the fleet of aircraft.

8. One or more computer-readable media having thereon instructions that when executed by a computer implement the method of claim 1.

9. A system for assigning aircraft to routes, the system comprising:

means for receiving fuel consumption data for each aircraft and aircraft engine of a fleet of aircraft;

means for normalizing the aircraft and aircraft engine fuel consumption data based on environmental factors experienced y the aircraft and the aircraft engines during the aircraft flights when the fuel consumption data was obtained;

means for determining a fuel efficiency for each aircraft and aircraft engine using the normalized fuel consumption data;

means for receiving information related to routes serviced by the fleet of aircraft; and means for determining an assignment of aircraft and engine combinations to the routes serviced by the fleet of aircraft based on the determined fuel efficiency for each aircraft and aircraft engine of the fleet of aircraft, and the received information relating to routes to be serviced by the fleet of aircraft.

10. The system of claim 9 wherein the information related to fuel efficiency for each aircraft and aircraft engine of the fleet of aircraft is updated with snapshots of sensor data obtained during flights of the aircraft of the fleet of aircraft.

11. The system of claim 9 wherein the snapshots are transmitted to a computer system during flights of the aircraft of the fleet of aircraft.

12. The system of claim 9 wherein the snapshots are transmitted to a computer system after each aircraft of the fleet of aircraft has landed after a flight.

13. The system of claim 9 wherein the fuel consumption data for each aircraft and aircraft engine of the fleet of aircraft is received via electronic flight bags.

14. The system of claim 9 further comprising automated means for obtaining the fuel consumption data for each aircraft and aircraft engine of the fleet of aircraft.

15. A system for assigning aircraft to routes, the system comprising:

a fleet of aircraft each including:

a fuel efficiency data manager to obtain information related to fuel consumption for the aircraft and at least one aircraft engine installed on the aircraft, and at least one wireless communication unit, coupled to the fuel efficiency data manager, to selectively transmit information related to fuel consumption for the aircraft and the at least one aircraft engine and transmit information related to environmental factors experienced by the aircraft and the at least one aircraft engine; and a computer system communicatively coupled to the fleet of aircraft, the computer system including:

a datastore of information related to fuel consumption of each aircraft and aircraft engine of the fleet of aircraft and information related to routes serviced by the fleet of aircraft, the datastore embodied on a computer readable medium; and an optimizer component to normalize the aircraft and aircraft engine fuel consumption data based on the environmental factors received by said at least one wireless communication unit and to determine an assignment of aircraft and engine combinations to the routes serviced by the fleet of aircraft based on the normalized fuel consumption data.

16. The system of claim 15 wherein the fuel efficiency data manager is to obtain snapshots of sensor data during each flight of the aircraft to obtain information related to fuel consumption for each aircraft and aircraft engine of the fleet of aircraft.

17. The system of claim 15 wherein the fuel efficiency data manager selectively causes the snapshots to be transmitted to a computer system for processing during flights of the aircraft of the fleet of aircraft.

18. The system of claim 15 wherein the fuel efficiency data manager selectively causes a notification to be sent to the computer system to initiate a download of the fuel consumption information for processing after the aircraft has landed after a flight.

19. The system of claim 15 wherein the fuel efficiency data manager is hosted by an electronic flight bag of the aircraft.

20. The system of claim 15 wherein the computer system provides a portal service subscribed to by an operator of the fleet of aircraft.

* * * * *

UNITED STATES PATENT AND TRADEMARK OFFICE
CERTIFICATE OF CORRECTION

PATENT NO.       : 7,606,641 B2                                                Page 1 of 1
APPLICATION NO.  : 11/197101
DATED            : October 20, 2009
INVENTOR(S)      : David L. Allen It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 603 days.

Signed and Sealed this

Twelfth Day of October, 2010

David J. Kappos
*Director of the United States Patent and Trademark Office*